United States Patent
Meubus et al.

(10) Patent No.: US 6,212,261 B1
(45) Date of Patent: Apr. 3, 2001

(54) INTERNET-BASED TELEPHONE CALL MANAGER

(75) Inventors: Charles Meubus, Westmount; Sylvain Jodoin, Montreal; Alan Bernardi, Town of Mount-Royal, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/377,049

(22) Filed: Aug. 19, 1999

Related U.S. Application Data

(62) Division of application No. 08/911,036, filed on Aug. 14, 1997, now abandoned.
(60) Provisional application No. 60/023,903, filed on Aug. 14, 1996.

(51) Int. Cl.[7] .................................................. H04M 1/64
(52) U.S. Cl. ................................ 379/88.12; 379/88.11; 379/88.17; 379/83.17
(58) Field of Search ................................ 379/67.1, 88.11, 379/88.12, 88.13, 88.14, 88.17, 88.19, 88.2, 88.21, 88.22, 90.01, 93.01, 93.17, 215

(56) References Cited

U.S. PATENT DOCUMENTS

| | | | |
|---|---|---|---|
| 4,771,425 | 9/1988 | Baran et al. | 370/85 |
| 4,969,184 | 11/1990 | Gordon et al. | 379/100 |
| 4,995,074 | 2/1991 | Goldman et al. | 379/97 |
| 5,363,431 | 11/1994 | Schull et al. | 379/67 |
| 5,434,906 | 7/1995 | Robinson | 379/67 |
| 5,513,251 * | 4/1996 | Rochkind et al. | 379/215 |
| 5,533,110 | 7/1996 | Pinard et al. | 379/201 |
| 5,577,105 | 11/1996 | Baum et al. | 379/93 |
| 5,604,737 | 2/1997 | Iwami | 370/352 |
| 5,608,786 | 3/1997 | Gordon | 379/100 |
| 5,610,910 | 3/1997 | Foscaneanu et al. | 370/351 |
| 5,625,676 | 4/1997 | Greco et al. | 379/88 |
| 5,805,587 * | 9/1998 | Norris et al. | 370/352 |
| 5,809,128 | 9/1998 | McMullin | 379/215 |
| 5,825,867 * | 10/1998 | Epler et al. | 379/215 |
| 5,841,966 * | 11/1998 | Irribarren | 395/200.36 |
| 5,894,504 * | 4/1999 | Alfred et al. | 379/88.13 |

FOREIGN PATENT DOCUMENTS

| | | |
|---|---|---|
| 56456/94 | 7/1996 | (AU) . |
| 2110711 | 1/1993 | (CA) . |
| 2197204 | 2/1996 | (CA) . |
| 2167215 | 7/1997 | (CA) . |
| 0 732 835 | 9/1996 | (EP) . |

(List continued on next page.)

OTHER PUBLICATIONS

BT Technol J. vol. 15, No. 2, (1997) pp. 145–157.
IBM Technical Disclosure Bulletin, vol. 37, No. 9, (1994) pp. 101–104.

(List continued on next page.)

Primary Examiner—Scott L. Weaver

(57) ABSTRACT

A method is provided that allows data access service provider subscribers to manage their telephone service through a data connection. The subscriber is enabled to obtain call data information and is provided real time control. During a data call, a visual incoming call indicator informs the subscriber, through a popup window, connected to the data access service provider that there is a call attempt. A visual message waiting indicator allows a subscriber, connected to the data access service provider to be notified of a pending message on the voice message system. A visual call disposition allows the subscriber, through the data connection, to dispose of calls. The call disposition options include forwarding a call to voice mail, playing an announcement to the calling party, forwarding the call to another line, sending a text message which could be converted to speech using text to speech technology, answering the call using voice over data call or terminating the data connection in order to accept the call.

15 Claims, 8 Drawing Sheets

FOREIGN PATENT DOCUMENTS

| | | |
|---|---|---|
| WO 94/24803 | 10/1994 | (WO) . |
| WO 95/18501 | 7/1995 | (WO) . |
| WO 96/05684 | 2/1996 | (WO) . |
| WO 96/09714 | 3/1996 | (WO) . |
| WO 96/20553 | 7/1996 | (WO) . |
| WO 96/38018 | 11/1996 | (WO) . |
| WO 97/26749 | 7/1997 | (WO) . |
| WO 97/35416 | 9/1997 | (WO) . |
| WO 97/37483 | 10/1997 | (WO) . |
| WO 97/47118 | 12/1997 | (WO) . |
| WO 98/01985 | 1/1998 | (WO) . |

OTHER PUBLICATIONS

"Workstation Communications System", IBM Technical Disclosure Bulletin, 37(9) (Sep. 1994), pp. 101–104.

Babbage, R. I. Moffat, A. O'Neill and S. Sivaraj, "Internet Phone—Changing the Telephony Paradigm?", BT Technology Journal, 15(2) (Apr. 1997) pp. 145–157.

Hansson, A., R. Nedjeral and I. Tonnby, "Phone Doubler—A Step Towards Integrated Internet and Telephone Communities", Ericsson Review 4 (1997), pp. 142–151.

"Here It Comes—the Phone Doubler", Ericsson Connexion, (Jun. 1997) p. 47.

"Internet and Ericsson", Ericsson Connexion, (Dec. 1996), pp. 46–47.

Low, C. "The Internet Telephony Red Herring", Hewlett Packard, Laboratories Tech. Report, May 15, 1996, pp. 1–15.

CMP Publications, Inc., Sam Masud, "Product Supports Voice on Net", Apr. 7, 1997, pp. 1–2.

Business Wire, Inc., "Ericsson Product Allows Simultaneous Voice and Internet Connections Over One Phone Line", Mar. 11, 1997, pp. 1–2.

Business Wire, Inc., "Ericsson's New Phone Doubler Combines Voice and Internet Over a Single Telephone Line", Mar. 10, 1997, pp. 1–2.

Baran, P., "On Distributed Communications Networks", IEEE Transactions on Communications, Mar. 1964, pp. 1–9.

Shankar, U. and C. Lai, "Interworking Between Access Protocol and Network Protocol for Interswitch ISDN Services", TENCON '89, Bombay, India, Nov. 1989.

Casner, et al., "RFC14ZZ: Integrated Service in the Internet Architecture", Sep., 1993.

Clark, D.D., S. Shenker and L. Zhang, "Supporting Real–Time Applications in an Integrated Services Packet Network: Architecture and Mechanism", SIGCOMM92, Aug. 1992.

Yang, C., "RFC1789: INETPhone: Telephone Services and Servers on Internet", Network Working Group, Apr. 1995.

Braden et al., "RFC 1633: Integrated Services in the Internet Architecture: an Overview", Network Working Group, Jun. 1994.

Burson, A.F. and A.D. Baker, "Optimizing Communications Solutions", IEEE Communications Magazine, 31(1), (Jan. 1993), pp15–19.

* cited by examiner

INTERNET-BASED TELEPHONE CALL MANAGER

CROSS-REFERENCE TO RELATED APPLICATIONS

This application is a divisional of application Ser. No. 08/911,036 filed Aug. 14, 1997 now abandoned which claims benefits from U.S. Provisional Application No. 60/023,903 filed Aug. 14, 1996 now abandoned.

FIELD OF THE INVENTION

The present invention relates to handling telephone related messages during data communications sessions.

1. Background to the Invention

As a result of the increasing popularity of the Internet and the World Wide Web, more and more users stay connected to their Internet service provider, mainly through dial-up modem connections, for durations well exceeding the average holding time for voice calls (3 minutes). During these calls, the call waiting indicator is usually disabled since the tone generated by this feature would disrupt the data stream. Since the Internet session in most cases occupies the only telephone line in the house, the subscriber is neither able to detect nor respond to a call attempt.

2. Summary of the Invention

It is an object of the present invention to provide improved telephone call handling during data communication sessions.

According to one aspect of the present invention there is provided a method of providing an indication of an incoming call to a called station coupled to a telecommunications network, the called station having a data processing terminal engaged in a data call with a data communications network, the data call being through a connection in the telecommunications network to an access gateway for the data network, the method comprising the steps of providing a signal advising of the incoming call from the access gateway, over the data call connection through the telecommunications network, to the data processing terminal and generating by the data processing terminal, responsive to receiving the signal, an incoming call indication.

According to another aspect of the present invention there is provided a method of providing an indication of a message waiting at a voice messaging service to a called station coupled to a telecommunications network, the called station having a data processing terminal engaged in a data call with a data communications network, the data call being through a connection in the telecommunications network to an access gateway for the data network, the method comprising the steps of providing, by the telecommunications network, an incoming call intended for the called station to a voice messaging service whereby the incoming call may record a message, providing a signal advising of the message waiting from the access gateway, over the data call connection through the telecommunications network, to the data processing terminal and generating by the data processing terminal, responsive to receipt of the signal, the message waiting indication.

According to a further aspect of the present invention there is provided a method of disposing of an incoming call intended for a called station coupled to a telecommunications network, the called station having a data processing terminal engaged in a data call with a data communications network, the data call being through a connection in the telecommunications network to an access gateway for the data network, the method comprising the steps of holding call processing of the incoming call at a switching system in the telecommunications network, providing a signal advising of the incoming call from the access gateway, over the data call connection through the telecommunications network, to the data processing terminal, receiving from the data processing terminal, via the access gateway, instructions for disposing of the incoming call and continuing the call processing of the incoming call at the switching system according to the received instructions.

According to an additional aspect of the present invention there is provided a system for interconnecting a telecommunications network and a data communications network, comprising a telecommunications gateway and a data network gateway adapted to interface the telecommunications network and the data network, one or more stations coupled to the telecommunications network, each station having a data terminal and a telephone terminal, means for recognizing, responsive to an incoming call being directed to a particular station, that the data terminal of the particular station has a data call connection through the telecommunications network to the data network and means for signalling information relating to the incoming call from the telecommunications network, via the telecommunications and data network gateways, over the data call connection to the data terminal of the particular calling station.

According to a still further aspect of the present invention there is provided a method of managing telephone service to a called station coupled to a telecommunications network while the called station is engaged in a data call, the method comprising the steps of providing a message indicative of an incoming call to the called station via the data call, accepting a message from the called station via the data call and disposing of the incoming call in response to the accepted message.

In accordance with another aspect of the present invention there is provided a method of providing an indication of a message waiting at a voice messaging server to a called station coupled to a telecommunications network. The called station has a data processing terminal engaged in a data call with a data communications network. The data call is through a connection in the telecommunications network to an access gateway for the data network. The method includes receiving an indicator of a recorded message at the voice messaging server resulting from a call intended for the called station; in response to the indicator, providing a signal advising of the recorded message at the voice messaging server, over the data call connection through the telecommunications network by way of the access gateway to the data processing terminal.

In accordance with yet a further aspect of the present invention, there is provided a method of providing an indication of a message waiting at a voice messaging service for a called station at a data processing terminal while the called station has the data processing terminal engaged in a data call with a data communications network. The data call is through a connection in the telecommunications network to an access gateway for the data network. The method includes receiving at the data processing terminal a signal advising of the message waiting from the access gateway, and generating the message waiting indication, responsive to receipt of the signal.

In accordance with another aspect of the present invention, there is provided a computer readable medium storing computer executable instructions that when loaded at a data processing terminal interconnected to a data network by way of connection through a telephone network, adapt the data processing terminal to, receive from a telephone network gateway in communication with the data network, a signal advising of a stored message waiting for the subscriber at a voice mail server in communication with the telephone network, and generate responsive to receipt of the signal, a message waiting indication at the data terminal.

In accordance with yet a further aspect of the present invention, there is provided a computer readable medium storing computer executable instructions that when loaded at a telephone network gateway in communication with a data network and a voice mail server interconnected with a telephone network, adapt the gateway to receive from the voice mail server, an indicator of a stored message waiting at the voice mail server, for a subscriber; originate a signal indicative of the received indicator to the data terminal, so that the data terminal may provide a message waiting indication for the subscriber, while the subscriber is interconnected with the data network by way of a connection through the telephone network.

In accordance with yet a further aspect of the present invention, there is provided a voice mail server interconnected with a telephone network to record messages destined for a subscriber, the voice mail server coupled to a data network by way of a network gateway, the network gateway operable to provide an indication of a waiting message at the voice mail server to the subscriber, by way of the data network, when the subscriber is interconnected to the data network by way of a call to the telephone network; the voice mail server operable to provide the network gateway an indicator of the waiting message.

The present invention has the advantage of allowing a subscriber to monitor and control telephone services while engaged in a data call, via the data call.

The basic concept behind the present invention is to combine the Public Switched Telephone Network (PSTN) and the Internet service providers' enhanced signalling and data communication capabilities to provide incoming call information and control to an Internet subscriber. With the Internet Call Manager, the subscriber is informed of call attempts and can dispose of the call as deemed appropriate. Furthermore, subscribers connected by modem cannot check if they have pending messages without terminating their session. The visual message waiting indicator allows them to be informed of their mailbox status within their Internet session.

Terminology and acronyms

Caller
  Person that calls the subscriber. The caller can reach the subscriber in two ways, either directly, i.e., the caller dials the subscriber's DN, or indirectly, i.e., the caller dials a DN that is forwarded to the subscriber's DN.
Data Access Service Provider (DASP)
  Data network operator that sells access services to its data network that allows the subscribers to communicate through the DASP's network and other data networks.
DASP User
  Person that subscribes to and uses DASP services.
Forwarding from Station Number (FF)
  Parameter conveyed over the control between the PSTN and the VMS system and used by the VMS system as the mailbox identifier.
Subscriber
  A DASP user that subscribes also to the Call Manager service.
VMS Subscriber
  Person that subscribes to a VMS.
Acronyms
  BRI—Basic Rate Interface
  CPE—Customer Premise Equipment
  DASP—Data Access Service Provided
  DN—Directory Number
  ICM—Internet Call Manager
  ISDN—Integrated Services Digital Network
  ISP—Internet Service Provider
  MWI—Message Waiting Indicator
  PSTN—Public Switched Telecommunication Network
  SMDI—Simplified Message Desk Interface
  SS7—Signalling System #7
  VMS—Voice Messaging Service
  VMS-SP—VMS Service Provider An advantage of the method of the present invention is allowing data access service providers (DASP) subscribers to manage their telephone service through their DASP connection. The subscriber can obtain call data information and provides real time call control.

The service in accordance with an embodiment of the present invention has the following components.

A Visual Incoming.Call Indicator (VICI) informs a subscriber through a popup window connected to the DASP that there is a call attempt. When available the user could be provided with the CLID and the calling name. Another version of this feature could inform the subscriber of a call attempt through Email.

A Visual Message Waiting Indicator (VMWI) allows a subscriber connected to the DASP to be notified of pending message on the VMS through a convenient screen display.

A Visual Call Disposition (VCD) allows the subscriber through the DASP connection to dispose of the calls following a visual incoming call indication. The subscriber can optionally:
  forward the call to voice mail
  play an announcement (perhaps personalized)
  forward the call to another line
  send a text message which would be read using text to speech technology
  answer the call using voice over Internet
  terminate or park the Internet connection and take the call.

A method in accordance with the present invention introduces the concept of combining the Public Switched Telephone Network (PSTN) and Data Access Service Provider (DASP) enhanced signalling and data communication capabilities to provide incoming call information and control to a DASP subscriber.

In the following descriptions, specific instances of the PSTN enhanced signalling capabilities are used for the purpose of describing the concept. However, those skilled in the art will recognize that the scope of this invention is not limited to these specific instances. To ease description, functional call flows are used.

BRIEF DESCRIPTION OF THE DRAWINGS

The present invention will be further understood from the following description with reference to the drawings in which.

DETAIL DESCRIPTION

Figure 1:
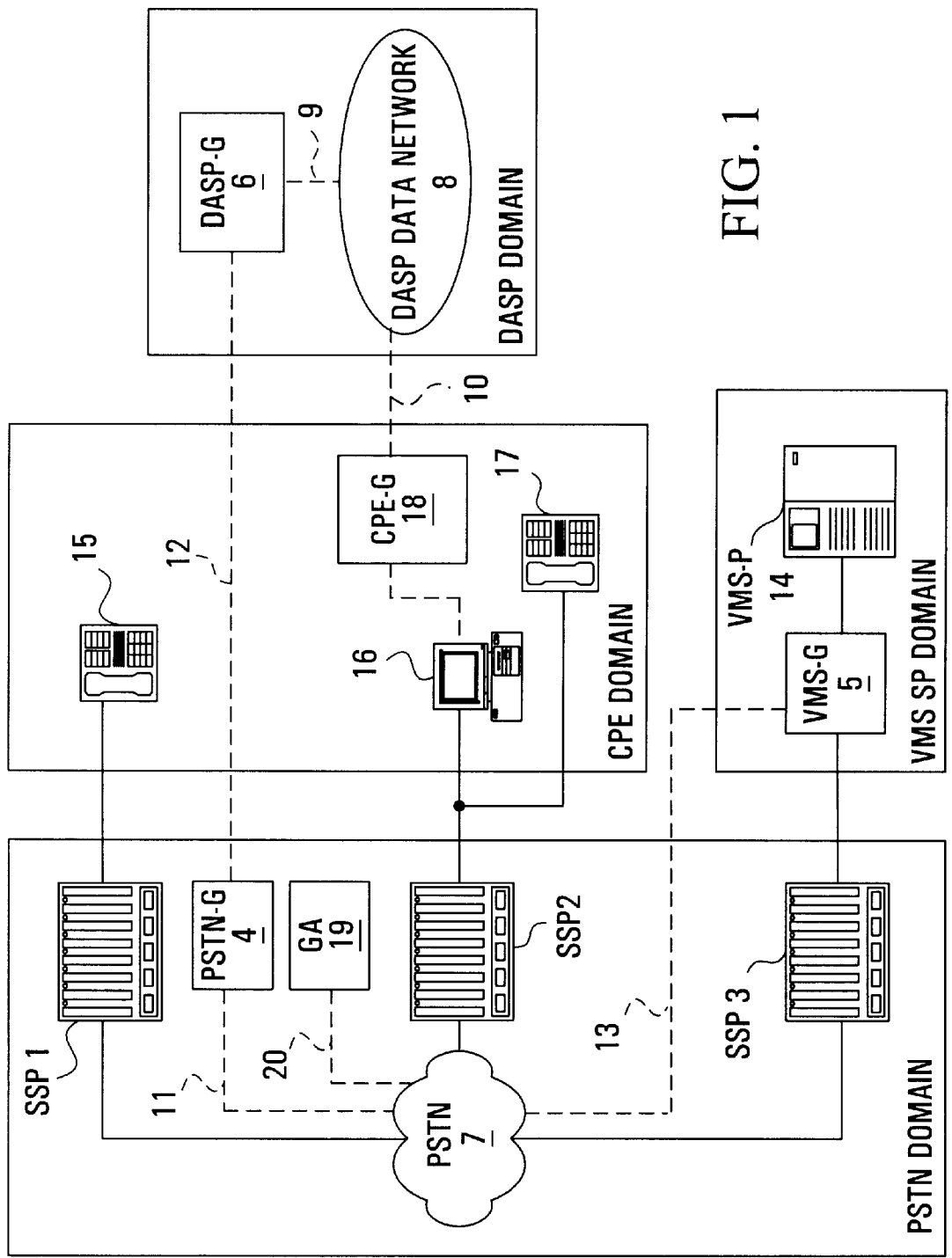
FIG. 1 illustrates an overview of a network in which the method in accordance with the present invention can be used.

Referring to FIG. 1 there is provided a view of the network components and interfaces required by this method. The network components are grouped into four (4) domains, i.e., the PSTN domain, the DASP domain, the Voice Message Service—Service Provider (VMS-SP) domain and the Customer Premise Equipment (CPE) domain. The PSTN domain network components are the SS7-capable telecommunication switches, labelled Service Switching Point (SST)[1, 2, 3], the Public Switched Telephone Network, labelled PSTN [5], the PSTN Gateway Agent, labelled GA [19] and the PSTN gateway, labelled PSTN-G[4]. The DASP domain network components are the DASP gateway, labelled DASP-G[7] and the DASP data network [6]. The VMS-P[11] and the VMS gateway, labelled VMS-G[12]. For conciseness, the VMS gateway [5] is shown as being part of the VMS-SP domain. However, depending on the implementation, the VMS gateway [5] component may be outside of the VMS-SP domain and be part of the PSTN domain. The CPE domain components are the caller's telephone [10], the DASP subscriber's telephone [9] and computer [8] and the CPE gateway, labelled CPE-G [18].

In FIG. 1, interfaces [9, 10, 11, 12, 13, 20], shown as direct link between network components and functions, illustrate the logical relationships between these components and functions and as such, have no implications on the physical paths, either direct of indirect, and signalling supports used in the different implementations of this invention.

The PSTN gateway (PSTN-G) [4] is the PSTN component that implements the PSTN-DASP signalling. Through interface [12], the PSTN gateway provides the DASP gateway with the incoming call indication and control for all registered subscribers [17]. Via interface [11], the PSTN gateway mediates with the other PSTN network components, including but not limited to the SSPs [1, 2, 3], the PSTN Gateway Agent [19] through interface [20] and the VMS-SP's VMS gateway [5] through interface [13], to obtain the incoming call information, the MWI information and to remotely control call establishment in the case of call disposition service, for incoming calls to subscriber [17].

The PSTN Gateway Agent (GA) [19] is the PSTN component that provides the PSTN-G [4] with the incoming call information and remote call control for incoming calls to registered subscribers [17].

The VMS-SP's VMS gateway's (VMS-G) [5] responsibility is to provide the PSTN gateway [4] with the MWI information for registered subscribers [17].

The DASP gateway (DASP-G) [6] is the DASP component that implements the PSTN-DASP signalling. Through interface [12], the DASP gateway obtains from the PSTN gateway [4] the incoming call indication and control for all registered subscribers [17]. The main responsibility of the DASP gateway is then to mediate, through interface [9], DASP data network [8] and interface [10], with the subscriber's [17]. For call disposition service, the CPE gateway receives the subscriber's inputs from the HMI and translates the call disposition request in the appropriate message format for delivery to the DASP gateway [6].

The above components can be implemented in various ways. A single component can be implemented as a stand-alone network equipment, multiple components can be combined in a single network equipment or a given component can be partitioned over two (2) or more network equipments.

In the following sections, methods and systems are described which implement the service components of this invention, namely, call indication, MWI delivery and call disposition. However, the scope of this invention is not limited to these implementations, which are merely illustrative. Finally, for each service component, a specific service scenario issued for simplicity of description only. The invention is not limited to these service scenarios.

The following data is used in the functional flows:
caller's DN is Dnc
caller's name is Name_c
subscriber's DN is Dns
subscriber's Name is Name_s
DASP gateway's DN is Dng (where applicable)
VMS's DN is Dnv.

Incoming call indication

Figure 2:
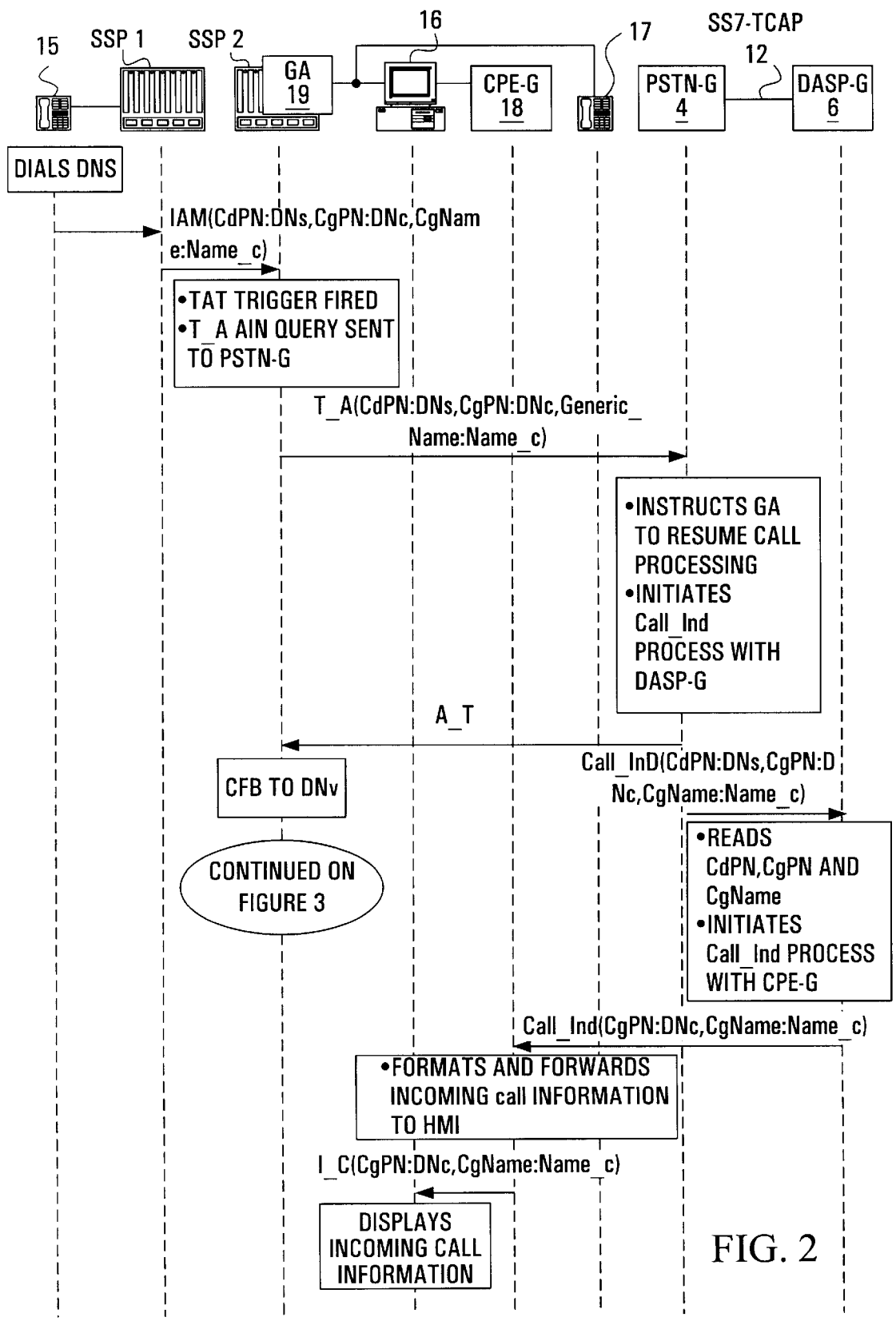
FIGS. 2 and 3 graphically illustrate the call-indication functional flow in accordance with another embodiment of the present invention.
Figure 3:
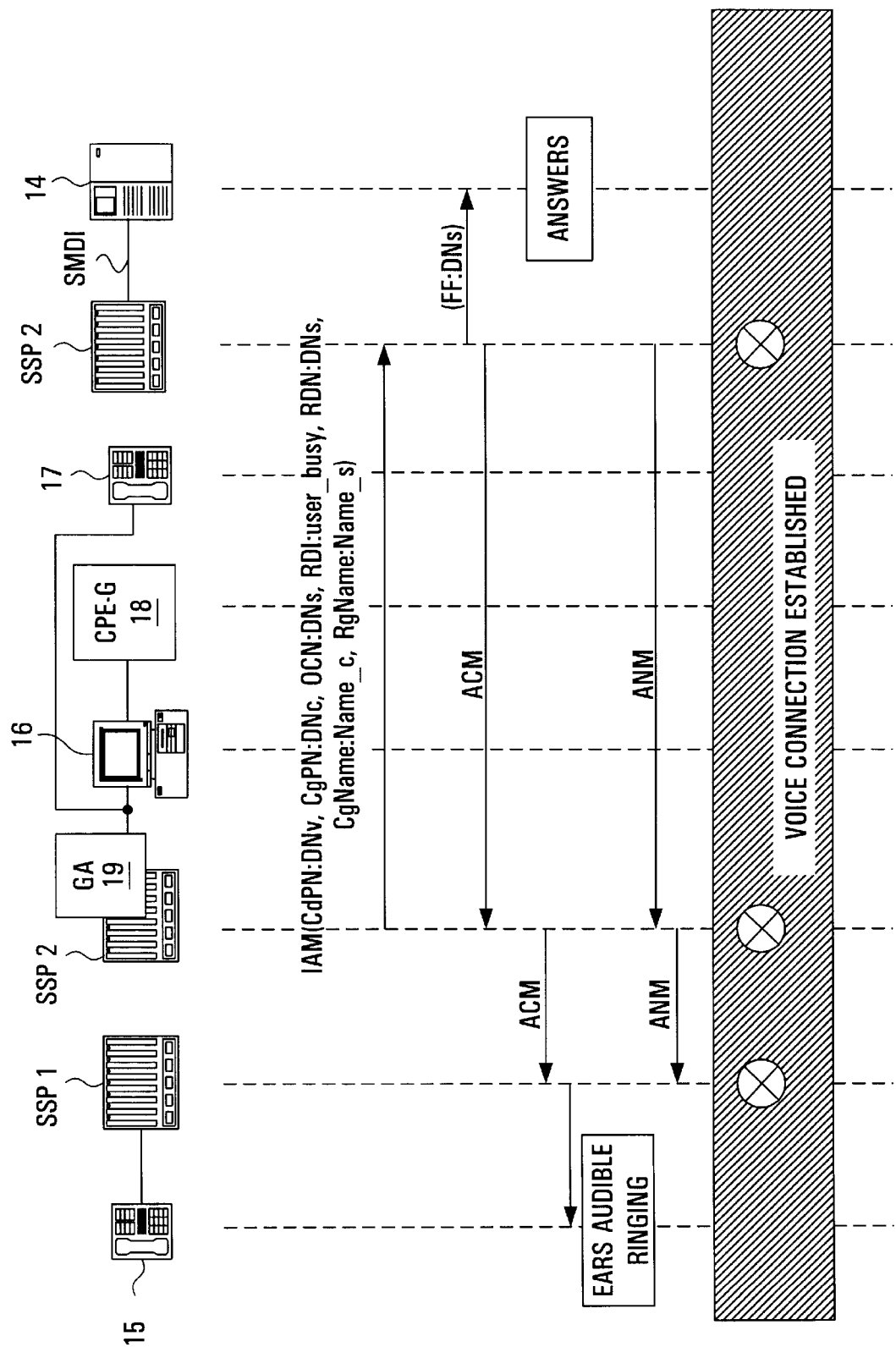

Referring to FIGS. 2 and 3 there is provided a detailed functional flow for a specific implementation of the call indication service component. The following service scenario is used in the functional flow for description purposes only, the method not being limited to this service scenario:
the subscriber subscribes to a VMS
the subscriber's telephone line is busy due to a dial-up data session to the DASP.
all calls are interswitch.

In this implementation of the invention, the GA[19] is implemented using the AIN call model on SSP[2]. The PSTN-G[4] component could be implemented in many ways, including but not limited to an Advanced Intelligent Network (AIN) Service Control Point (SCP) an SS7 protocol analyzer and an SS7 mediation point. The PSTN signalling capabilities used are the Signalling System #7 (SS7) Transaction Capability Application Part (TCAP) as interfaces [11], [12] and [20].

The AIN call model GA [19] at the subscriber's [17] SSP [2] is used to detect incoming calls to subscriber's DN, using, for example, the AIN Termination_Attempt trigger. It communicates with the PSTN-G[4] using the SS7-based AIN SSP-t-SCP protocol as interfaces [11] and [20]. Upon incoming call to subscriber [17], the SSP [2] AIN Termination_Attempt trigger gets fired and sends incoming call information, including the caller's [15] DN and name, to the PSTN-G[4], using, for example, the AIN Termination_Attempt message, in which case the PSTN-G[4] could answer with an Authorize_Termination message. The PSTN-G[4] can then provide the DASP-G[6] with the required incoming call indication information. The DASP G[6], through a standard data communication protocol, including but not limited to TCP/IP, HTTP and FTP, communicates the information to the CPE-G[18]. This information is then formatted and displayed to the user.

Figure 4:
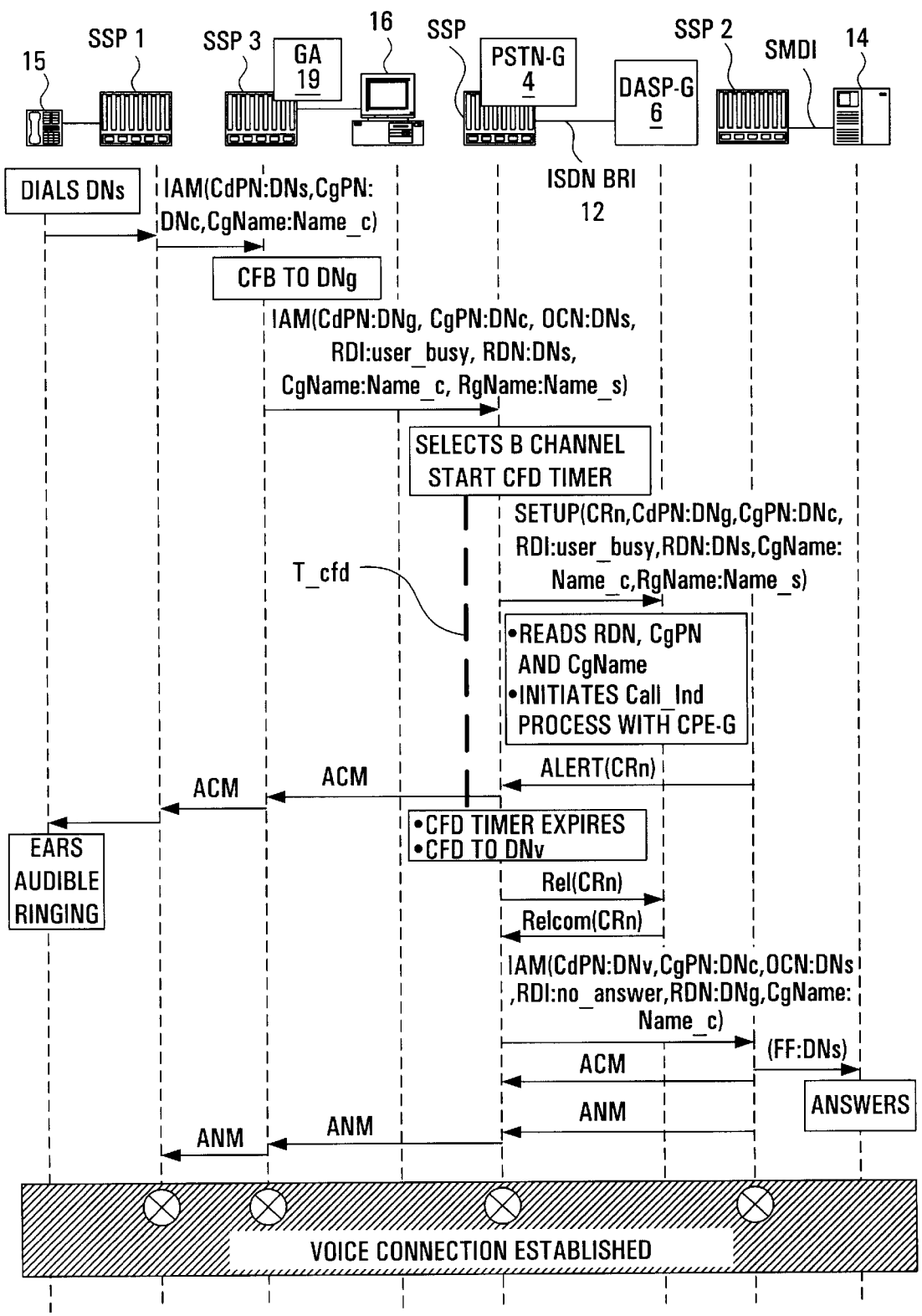
FIG. 4 graphically illustrates the call-indication functional flow in accordance with a further embodiment.

The terms used are:

TA: AIN Termination_Attempt trigger
TA: AIN Termination_Attempt SSP-SCP message
A_T: AIN Authorize_Termination SCP-SSP message
IAM: SS7 ISUP Initial Address Message
ACM: SS7 ISUP Address Complete Message
ANM: SS7 ISUP Answer Message
FF: SMDI Forwarded From number
CdPN: Called Party Number parameter
CgPN: Calling Party Number parameter
CgName: Calling Party Name parameter
OCN: Originally Called Number parameter
RDI: Redirecting Indicator parameter
RDN: last Redirecting Number parameter
RgName: Redirecting Name parameter Other implementations of this method to deliver the call indication service component are possible. They include but are not limited to the following one. Referring to FIG. 4 there is illustrated an embodiment of the present method. In this implementation of the invention, the GA[19] is implemented using the SSP-based [2] Call Forward Busy (CFB) telephony feature, the PSTN[4] component is implemented by a PSTN SSP and the PSTN signalling capabilities used are:

the Signalling System #7 (SS7) Integrated Services Digital Network User Park (ISUP) as interface [11] and [20]
the Integrated Services Data Network—Basic Rate interface (ISDN-BRI) as interface [12]
the Simplified Message Desk Interface (SMDI) for PSTN to VMS system signalling.

Terms used are:
Setup: ISDN BRI call Setup message
Alert: ISDN BRI Alert message
Rel: ISDN BRI Release message
CRn ISDN BRI Call Reference number n
CFB: PSTN Call Forward Busy Feature
CFD: PSTN Call Forward Don't Answer feature
T_cfd: CFD timer Message Waiting Indicator (MWI) Delivery Referring to FIG. 5, there is illustrated a detailed functional flow for a specific implementation of the MWI delivery service component. The following service scenario is used in the functional flow in FIG. 5 for description purposes only, the method not being limited to this service scenario:

the subscriber subscribes to the VMS
the subscriber's telephone line is busy due to a dial-up data session to the DASP.
all calls are interswitch
a message for the DASP subscriber [17] has just been left at VMS-P[14].

Figure 5:
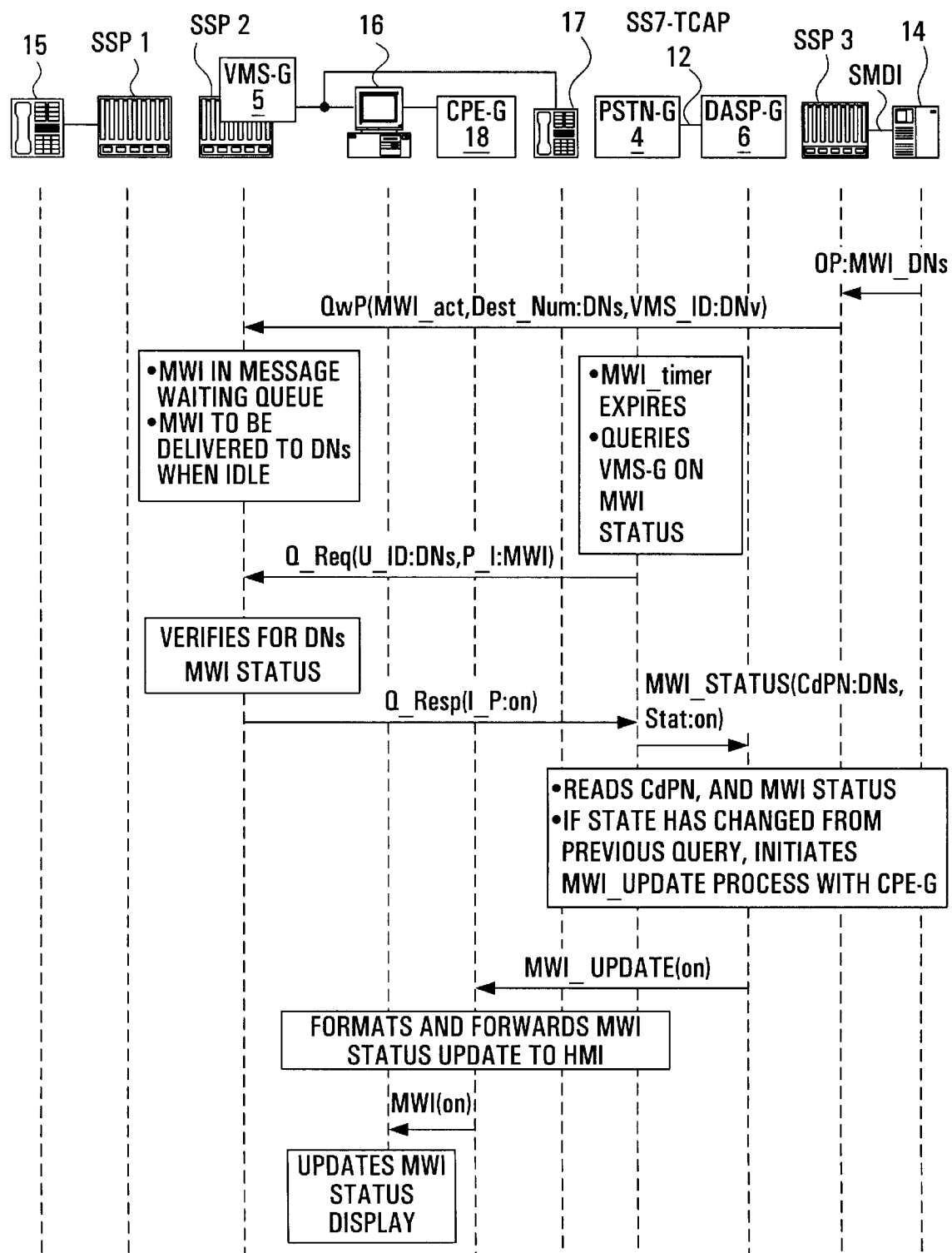
FIG. 5 graphically illustrates the message waiting indication functional flow in accordance with a further embodiment of the present invention.

In the embodiment of the invention of FIG. 5, the VMS-G (voice messaging service gateway) [5] is implemented using the AIN call model on SSP [2]. The PSTN-G [4] component is as discussed with regard to FIGS. 3 and 4. Incoming call indication, could be implemented in many ways, including but not limited to an AIN Service Control Point (SCP). The PSTN signalling capabilities used are the Signalling System #7 (SS7) Transaction Capability Application Part (TCAP) as interfaces [11], [12] and [13].

The AIN non-call associated capability VMS-G [5] at the subscriber's [17] DN. The PSTN-G[4] and the VMSG[5] communicates using the SS7-based AIN SSP-to-SCP protocol as interfaces [11] and [13]. A possibility is for the PSTN-G[4], when an incoming call has been detected using method described in regard to FIGS. 2 and 3. Incoming call indication, to start a timer set at the subscriber's [17] maximum allowed message length. At time-out, PSTN-G [4] sends an AIN non-call related Query_Request to SSP [2] requesting for status of subscriber3 s [17] MWI.SSP [2] answers with the AIN Query_Response with an on/off activation status code parameter. The PSTN-G[4] then provides the DASP-G [6] with the MWI information if necessary. The DASP-G [6], through a standard data communication protocol, including but not limited to TCP/IP, HTTP and FTP, communicates the information to the CPE-G [18]. This information is then formatted and displayed to the user.

Figure 6:
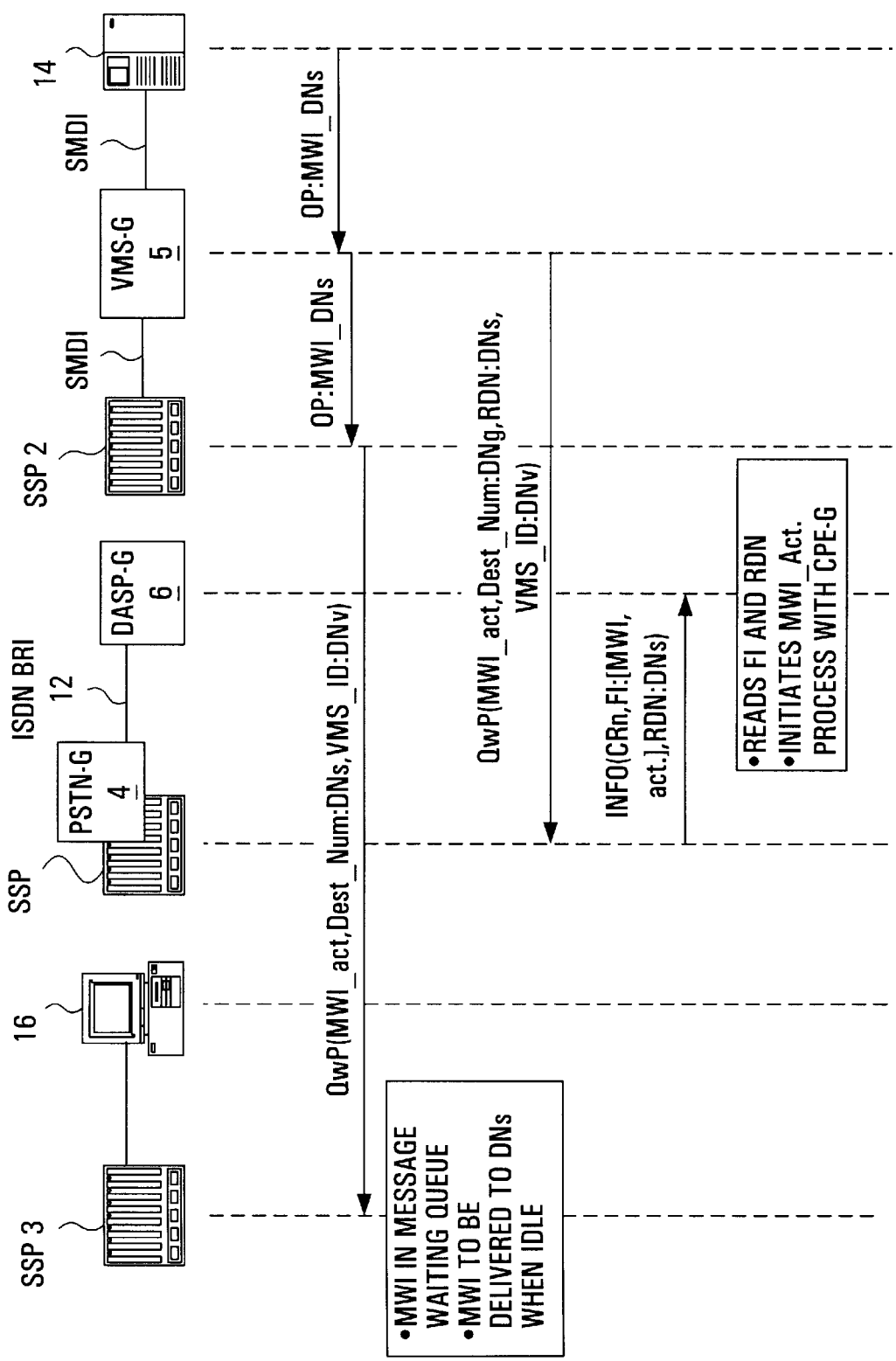
FIG. 6 graphically illustrates the message waiting indication functional flow in accordance with an additional embodiment of the present invention.

The terms used are:
Q_Req: SS7 AIN
QUERY_REQUEST SCP-SSP message
Q_Resp: SS7 AIN Query_Response SSP-SCP message
P_I: AIN Provide_Info parameter
I_P: AIN Info-Provided parameter Other implementations of this method to delivery the MWI delivery service component are possible. They include but are not limited to the following one. Referring to FIG. 6 there is illustrated an additional embodiment of the present invention, the VMS-G [5] component is implemented as an SMDI monitoring tool, the PSTN-G [4] component is implemented by a PSTN SSP and the PSTn signalling capabilities used are:

the Signalling System #7 (SS7) Transaction Capability Application Part (TCAP) as interfaces [11] and [13]
the Integrated Services Data Network—Basic Rate Interface (ISDN-BRI) as interface [12]
the Simplified Message Desk Interface (SMDI) for PSTN to VMS system signalling.

It shall be noted here that the parameter content of the TCAP messages used on interfaces 11 and 13 are not standard but adaptation of the NT proprietary TCAP messaging used to convey the MWI information.

Figure 7:
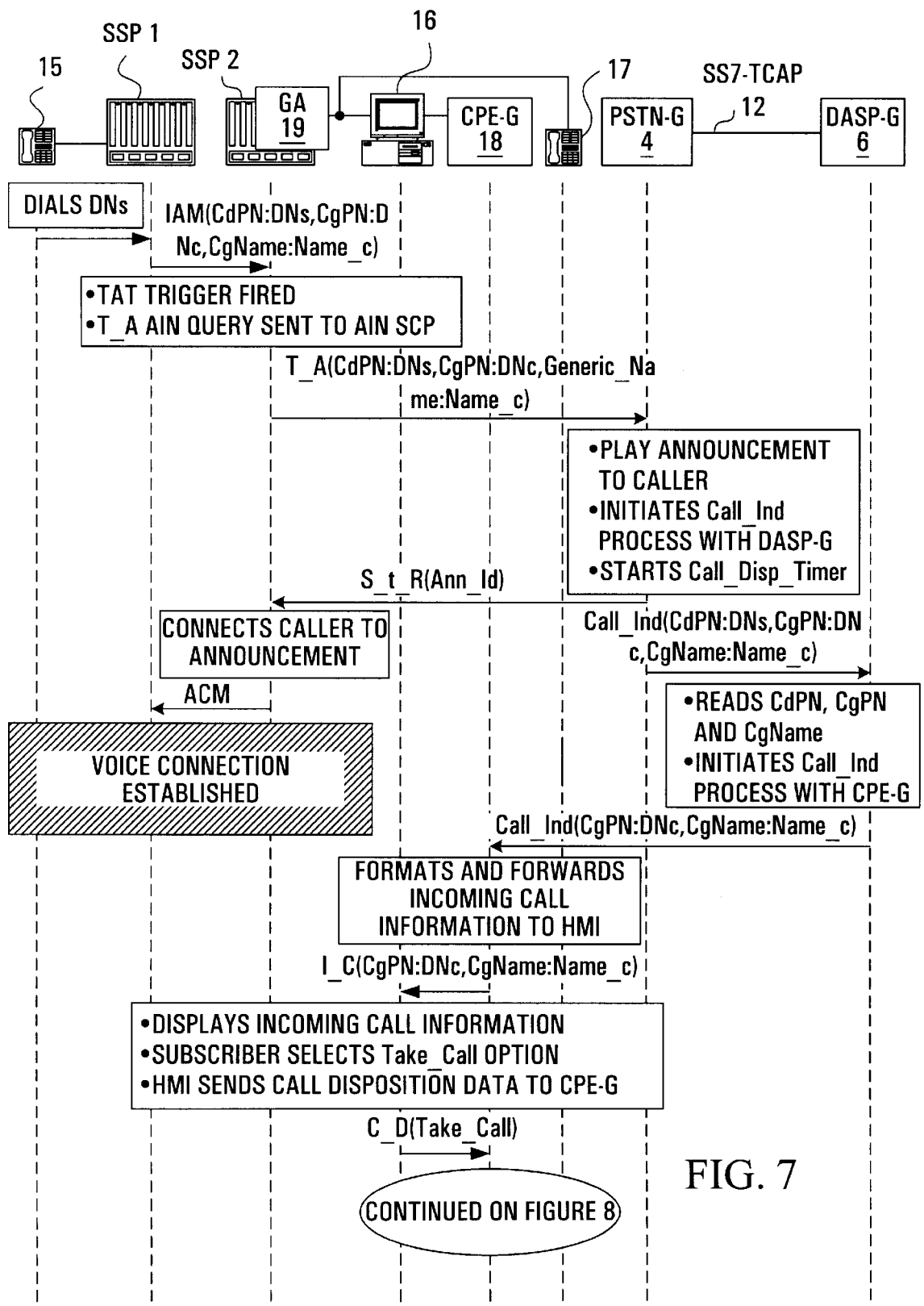
FIGS. 7 and 8 graphically illustrate the incoming call disposition functional flow in accordance with a still further embodiment of the present invention.
Figure 8:
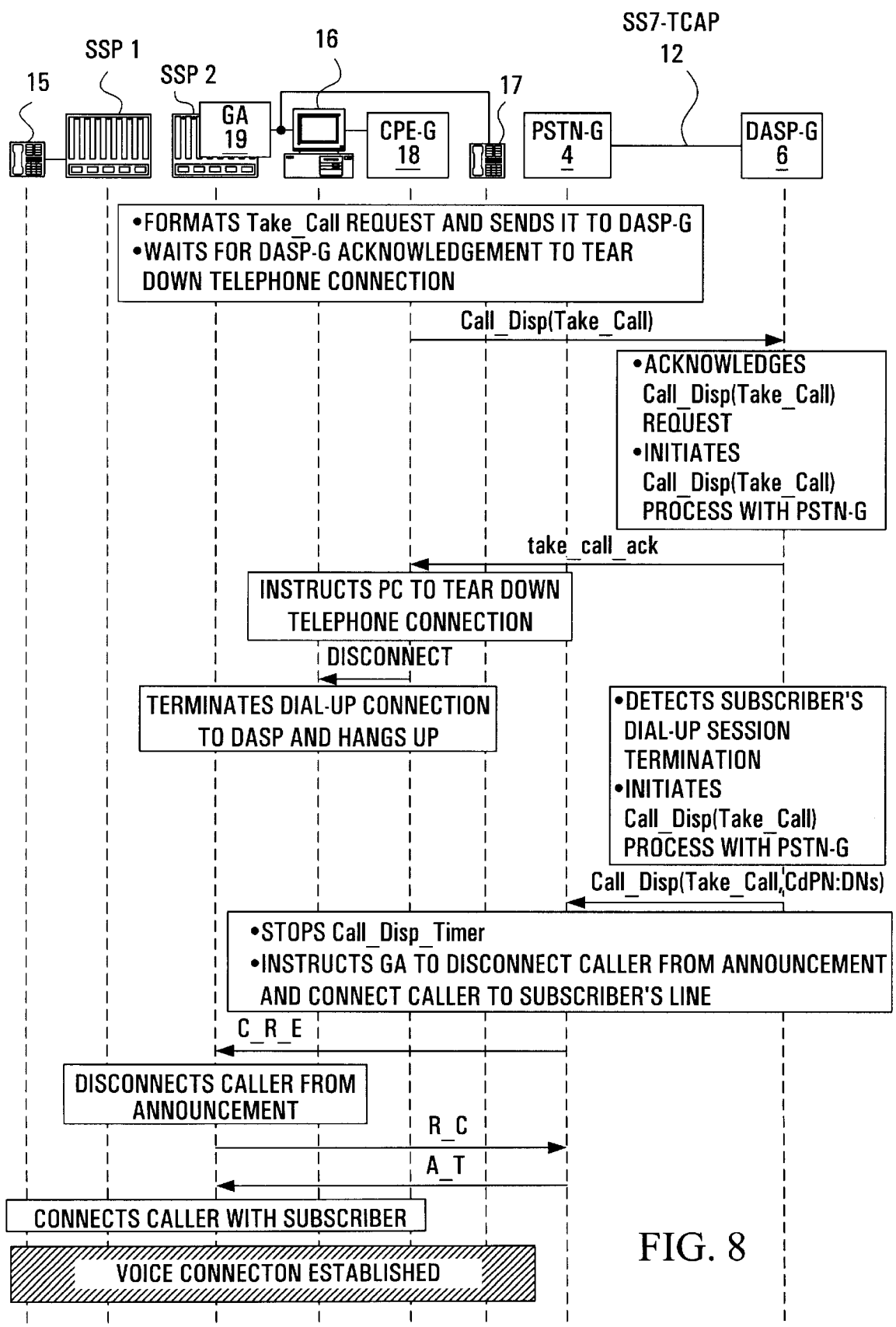

The terms used are:
QwP: SS7 TCAP Query with Permission package type
Info: ISDN BRI Information message
FI: ISDN BRI Feature Identification information element
Incoming call disposition Referring to FIGS. 7 and 8 there is illustrated a detailed functional flow for a specific implementation of the incoming call disposition service component. The following service scenario is used in the functional flow for description purposes only, the method being not limited to this service scenario:

the subscriber's telephone line is busy due to a dial-up data session to the DASP
all calls are interswitch
the subscriber decides to take the call and hence, selects the Take Call call disposition option.

In this implementation of the invention, the GA [19] is implemented using the AIN call model on SSP [2]. The PSTN-G [4] component could be implemented in many ways, including but not limited to an Advanced Intelligent Network (AIN) Service Control Point (SCP). The PSTN signalling capabilities used are the Signalling System #7 (SS7) Transaction Capability Application Part (TCAP) as interfaces [11], [12] and [20].

It shall be noticed that ALL the signalling over interfaces [12] and [9, 10] do not make reference to any existing protocol. It is provided only for sake of clarity of the whole process.

The terms used are:

IAM: SS7 ISUP Initial Address Message

TAT: AIN Termination_Attempt trigger

T_A: AIN Termination_Attempt SSP-SCP message

S_t-R: AIN Send_To_Resource SCP-SSP message

C_R_E: AIN Cancel_Resource_Event SCP-SSP message

R_C: AIN Resource_Clear SSP-SCP message

A_T: AIN Authorize_Termination SCP-SSP message

As discussed above with regard to FIGS. 2 and 3: Incoming call indication, the AIN call model on SSP [2] detects incoming calls to subscriber's DN using the Termination_Attempt trigger. The AIN call model also provides the remote call control capability required by the PSTN-G to control call establishment as required by the call disposition service component. To prevent situations where the caller hangs up for waiting too long, the subscriber [17] has a limited time windows (Call_Disp_Timer expires, a default treatment is provided (e.g., route to VMS). Finally, the other options of the call disposition service component (route to DN, route to VMS, route to announcement, route to canned messages, . . . ) can be implemented using the AIN Forward_Call PSTN-G[4] response to the SSP instead of the Authorize_Termination response.

Those skilled in the art will recognize that various modifications and changes could be made to the invention without departing from the spirit and scope thereof. It should therefor be understood that the claims are not to be considered as being limited to the precise embodiments set forth above, in the absence of specific limitations directed to each embodiment.

The embodiments of the invention in which an exclusive property or privilege is claimed are defined as follows:

1. A method of providing an indication of a message waiting at a voice messaging service to a called station coupled to a telecommunications network, the called station having a data processing terminal engaged in a data call with a data communications network, the data call being through a connection in the telecommunications network to an access gateway for the data network, the method comprising the steps of:

providing, by the telecommunications network, an incoming call intended for the called station to a voice messaging service enabled to record a message from the incoming call;

providing a signal advising of the message waiting from the access gateway, over the data call connection through the telecommunications network, to the data processing terminal; and generating by the data processing terminal, responsive to receipt of the signal, the message waiting indication.

2. A method as claimed in claim 1, wherein the signal is a message including information relating to the incoming call.

3. A method as claimed in claim 2, wherein the message includes information relating to the recorded message.

4. A method of providing an indication of a message waiting at a voice messaging server to a called station coupled to a telecommunications network, said called station having a data processing terminal engaged in a data call with a data communications network, said data call being through a connection in said telecommunications network to an access gateway for said data network, said method comprising:

receiving an indicator of a recorded message at said voice messaging server resulting from a call intended for the called station;

in response to said indicator, providing a signal advising of said recorded message at said voice messaging server, over said data call connection through said telecommunications network by way of said access gateway to said data processing terminal.

5. The method of claim 4, wherein said indicator is received from a telephone signaling network.

6. The method of claim 5, wherein said telephone network comprises an SS7 compliant network.

7. The method of claim 4, wherein said indicator includes information about said recorded messages.

8. The method of claim 4, wherein said signal is provided using and internet protocol.

9. The method of claim 8, wherein said data network comprises the Internet.

10. A method of providing an indication of a message waiting at a voice messaging service for a called station at a data processing terminal while the called station has the data processing terminal engaged in a data call with a data communications network, the data call being through a connection in the telecommunications network to an access gateway for the data network, the method comprising:

receiving at the data processing terminal a signal advising of the message waiting from the access gateway, and generating the message waiting indication, responsive to receipt of the signal.

11. The method of claim 10, wherein said signal is provided by way of using an internet protocol.

12. The method of claim 11, wherein said data network comprises the Internet.

13. A computer readable medium storing computer executable instructions that when loaded at a data processing terminal interconnected to a data network by way of connection through a telephone network, adapt said data processing terminal to, receive from a telephone network gateway in communication with said data network, a signal advising of a stored message waiting for said subscriber at a voice mail server in communication with said telephone network, and generate responsive to receipt of said signal, a message waiting indication at said data terminal.

14. A computer readable medium storing computer executable instructions that when loaded at a telephone network gateway in communication with a data network and a voice mail server interconnected with a telephone network, adapt said gateway to, receive from said voice mail server, an indicator of a stored message waiting at said voice mail server, for a subscriber;

originate a signal indicative of said received indicator to said data terminal, so that said data terminal may provide a message waiting indication for said subscriber, while said subscriber is interconnected with said data network by way of a connection through said telephone network.

15. A voice mail server interconnected with a telephone network to record messages destined for a subscriber, said voice mail server coupled to a data network by way of a network gateway, said network gateway operable to provide an indication of a waiting message at said voice mail server to said subscriber, by way of said data network, when said subscriber is interconnected to said data network by way of a call to said telephone network;

said voice mail server operable to provide said network gateway an indicator of said waiting message.

* * * * *